Dec. 7, 1954

E. G. BAILEY ET AL 2,696,511

PROCESS FOR THE THERMAL CONVERSION
OF LIQUID AND GASEOUS HYDROCARBONS

Filed June 25, 1948

INVENTORS
Ervin G. Bailey &
BY Ralph M. Hardgrove
ATTORNEY

Dec. 7, 1954

E. G. BAILEY ET AL 2,696,511

PROCESS FOR THE THERMAL CONVERSION
OF LIQUID AND GASEOUS HYDROCARBONS

Filed June 25, 1948

INVENTORS
Ervin G. Bailey &
BY Ralph M. Hardgrove

ATTORNEY

United States Patent Office 2,696,511
Patented Dec. 7, 1954

2,696,511

PROCESS FOR THE THERMAL CONVERSION OF LIQUID AND GASEOUS HYDROCARBONS

Ervin G. Bailey, Easton, Pa., and Ralph M. Hardgrove, Alliance, Ohio, assignors to The Babcock & Wilcox Company, Rockleigh, N. J., a corporation of New Jersey Application June 25, 1948, Serial No. 35,126

10 Claims. (Cl. 260—679)

This invention relates to a process and apparatus for the thermal conversion of liquid and gaseous hydrocarbons, and more particularly, to a process and apparatus of the character described in which optimum results are attained at relatively high reaction temperatures and under relatively low reaction pressures.

Since the relatively high temperatures necessary for the thermal conversion of liquid and gaseous hydrocarbons at low pressures is substantially higher than can be used safely in metallic heat exchangers it has heretofore been customary to carry out such conversion processes in regenerative heating furnaces in which a brick checkerwork or refractory mass is intermittently heated to a high temperature and then subsequently used as the heat exchanger for the conversion of the hydrocarbon. These furnaces are however characterized by the fact that their operation is necessarily intermittent due to the flow reversal necessary for reheating the checkerwork. The intermittent operation results in a continuously changing temperature in the reaction chamber which is undesirable from the standpoint of efficient and consistent cracking of the hydrocarbon feed. In addition the necessary reversals of the furnace, with the accompanying lag between the make and heating cycles, involve losses of both product and heating medium.

The object of this invention is to provide a commercially practical process and apparatus adapted for the thermal conversion of liquid and gaseous hydrocarbons at relatively high temperatures and relatively low pressures which are characterized by a high rate of heat transfer to the hydrocarbon being treated, low amount of coke formation, and the maintenance of stable operating conditions throughout the operating period.

Another object of this invention is to provide a process and apparatus for the thermal conversion of liquid and gaseous hydrocarbons at high temperatures and low pressures in which the temperature in the reaction zone can be controlled within narrow limits thereby permitting efficient and consistent cracking of the hydrocarbon feed.

A still further object of this invention is to provide an apparatus adapted for use in a continuous process characterized by its ability to transfer high temperatures to a fluid being heated at a higher rate of heat transfer than heretofore practicable.

Still another object of this invention is to provide a process and apparatus of the above noted type in which the reaction time can be controlled within narrow limits.

A further and more specific object is the provision of a method and apparatus of the character described in which a stream of hydrocarbon feed stock is continuously introduced into a relatively low pressure reaction chamber and heated to a cracking temperature therein by intimate contact with a circulating fluent mass of inert refractory heat transfer material to produce a cracked gas mixture having a predetermined composition, with all or substantially all of the heat requirements of the process being supplied by the sensible heat of heating gases introduced into the reaction chamber.

In accordance with this invention these and other objects which are incidental to its application can be attained by carrying out the thermal conversion of the liquid or gaseous hydrocarbon in a fluid heater of the type in which a fluent gas-pervious mass or column of solid heat transfer bodies passes downwardly by gravity through a heating chamber in which they are heated by the countercurrent passage of a gaseous heating fluid in heat transfer relation therewith, and thence through a connecting passage of reduced flow area to and through a subjacent chamber in which they supply substantially all the heat required by the hydrocarbon feed stock to bring it up to the conversion temperature as well as the heat needed for the conversion reaction. Fluid heating apparatus of this general type is disclosed and claimed in our prior joint application, Serial No. 502,580, filed September 16, 1943, which issued as U. S. Patent No. 2,447,306 on August 17, 1948.

In the accompanying drawings which illustrate a preferred type of fluid heater embodying features of this invention:

Figure 1:
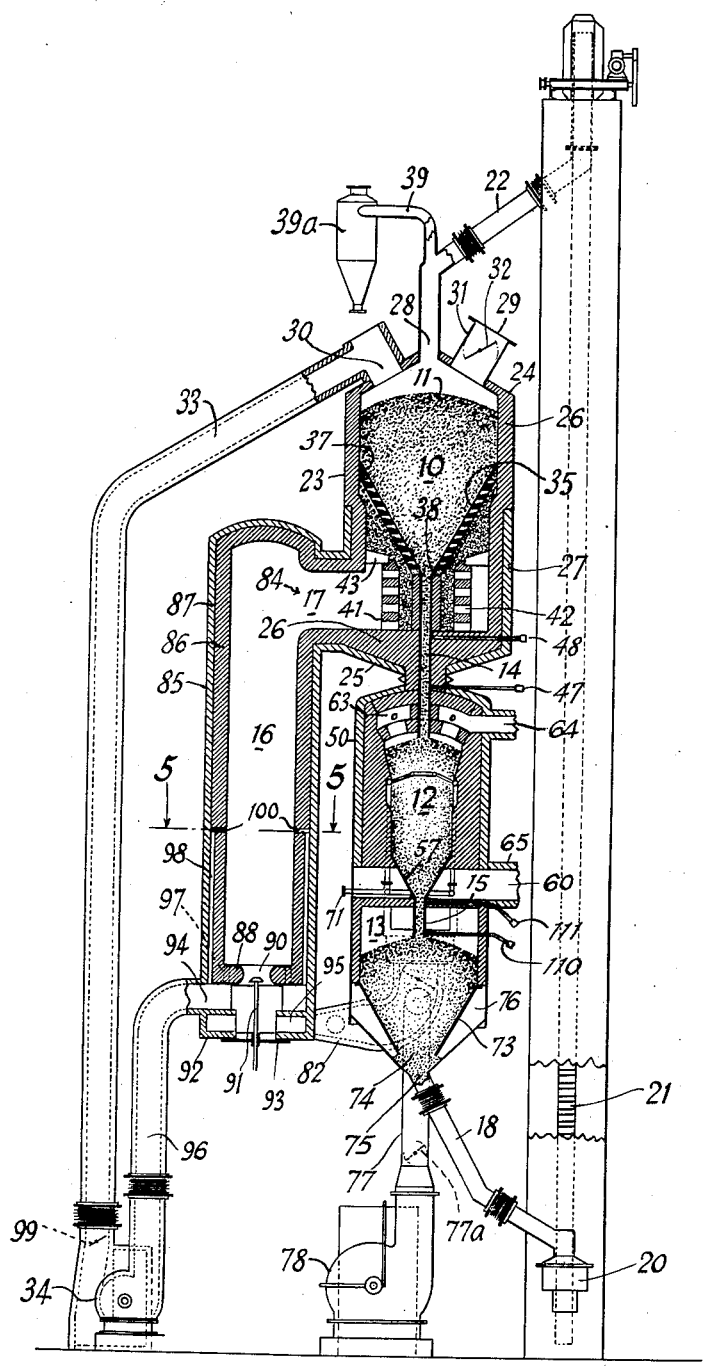
Fig. 1 is an elevation, partly in section, of a fluid heater constructed in accordance with our invention.
Figure 2:
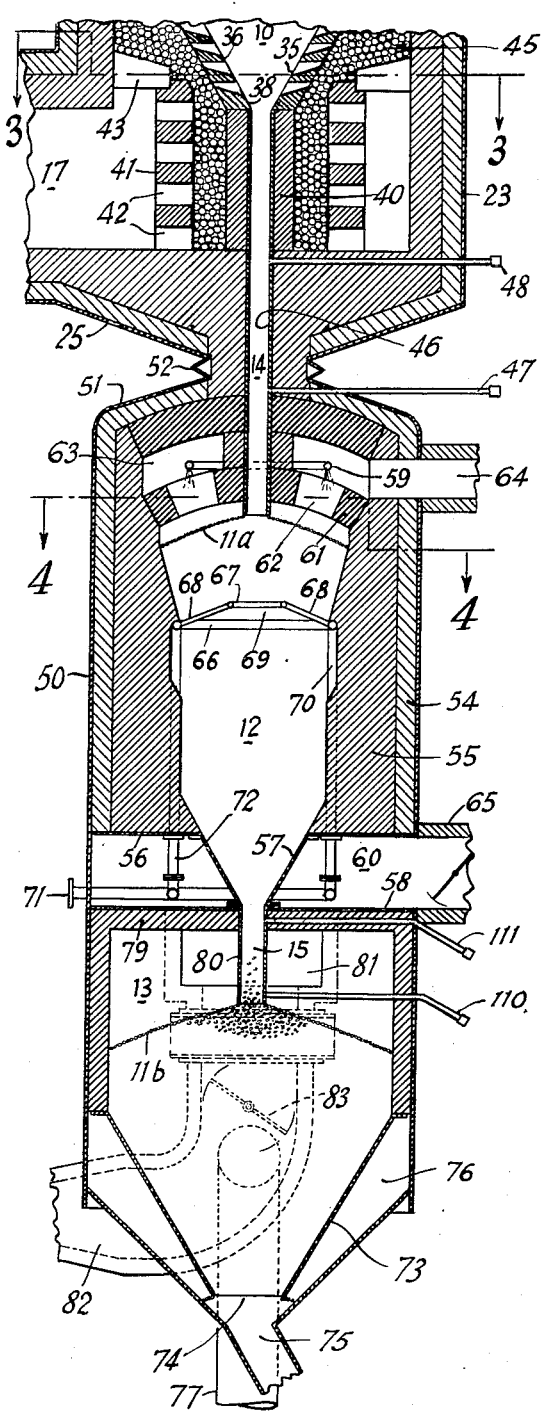
Fig. 2 is an enlarged vertical section of a portion of the apparatus shown in Fig. 1.
Figure 3:
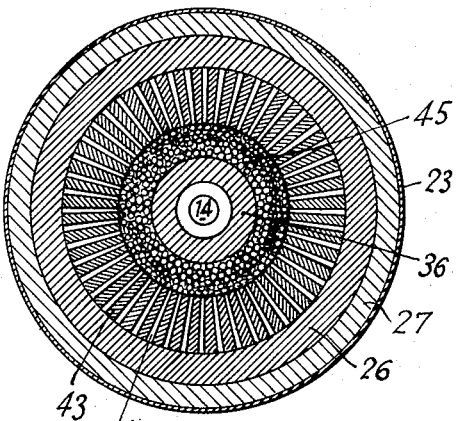
Figure 4:
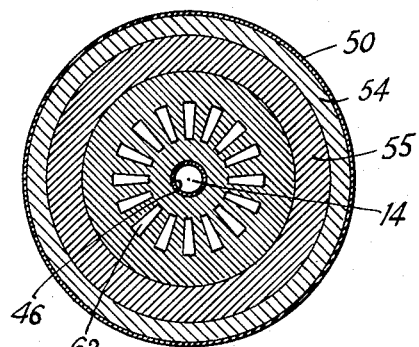
Figure 5:
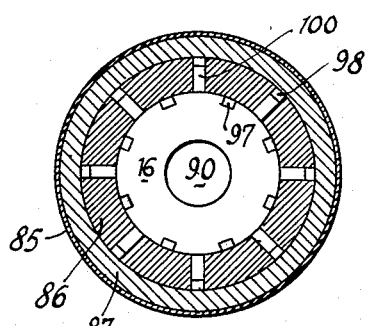

Figs. 3 and 4 are horizontal sections of the apparatus taken on the lines 3—3 and 4—4 respectively of Fig. 2; and Fig. 5 is a horizontal section through the combustion chamber taken on the line 5—5 of Fig. 1.

While the invention in its broader aspects is applicable to the treatment of a wide range of hydrocarbon materials, the apparatus illustrated in the drawings is particularly designed and especially adapted for the thermal treatment of petroleum hydrocarbons, such as natural gas or gasoline, artificial illuminating gas, gasoline vapor, oil vapor, gas oil vapor and other paraffin series hydrocarbons, olefin series hydrocarbons and cyclic hydrocarbons of the naphthene and benzene series, capable of being heat treated in the vapor phase to produce a cracked gas mixture.

In the fluid heater construction illustrated, the apparatus in general comprises three superimposed connected chambers, and upper heating chamber 10 wherein a fluent gas-pervious mass of solid heat transfer material 11 is heated by direct contact with a suitable heating fluid, and middle and lower chambers 12 and 13 respectively wherein the heated heat transfer material 11 is progressively cooled by direct heat transfer to a plurality of fluids being separately heated. The upper and middle chambers 10 and 12 are connected by a vertically elongated tubular conduit or throat 14 of reduced cross-section which forms a structurally unobstructed passageway therebetween for the gravity flow of heat transfer material from the upper chamber 10 to the subjacent middle chamber 12. Likewise the middle and lower chambers 12 and 13 are connected by a similar but shorter tubular throat 15 forming a structurally unobstructed passageway for the gravity flow of material from the middle chamber 12 to the subjacent lower chamber 13. The heating fluid for the upper chamber 10 is usually formed by gaseous products of combustion, which in the apparatus described are advantageously produced in a separate fluid fuel fired furnace 16 and delivered to the chamber 10 through a connecting passageway 17. The temperature and the percentage of oxygen in the heating gases delivered to the chamber 10 are regulated by the controlled recirculation of spent heating gases which are withdrawn from the upper portion of the chamber 10 and returned to the furnace 16 as hereinafter described for mixing with the newly generated products of combustion and delivered to the lower portion of the chamber 10. Thus, the heat transfer material is heated to a relatively high temperature during its passage through the upper chamber, with the heat content therein released during its passage through the middle and lower chambers 12 and 13 by contact with the fluids to be heated flowing therethrough. The cooled heat transfer material leaves the lower chamber 13 through a pipe 18 connected at its lower end to a suitable continuous feeder 20. The feeder regulates the rate of withdrawal of material from the fluid heating apparatus and discharges it into a continuous bucket elevator 21 which elevates and returns the heat transfer material through a pipe 22 to the chamber 10 for reuse in the heat exchange process.

A relatively wide range of materials can be used as the fluent solid heat transfer material 11, the material selected depending upon the particular operating conditions to be maintained within the fluid heating unit. In general the material should have a high strength and hardness, substantial resistance to thermal shock, and a high softening temperature. Such materials may be natural or manufactured refractories, corrosion resistant alloys and alloy steels, in small pieces of regular or irregular shape. As disclosed in said prior joint application, substantially spherical pellets of manufactured refractories have been successfully used. The size of pellet is such as to provide a large amount of surface area for transfer of heat and at the same time withstand the fluid flow velocities through the pellet mass while in the heating and cooling chambers without lifting. One preferred size of pellet is approximately 5/16 inches in diameter, but the size may vary above and below that value with the individual application of the fluid heater.

As shown in Fig. 1, the upper chamber 10 is defined by a cylindrical metallic casing 23 having a conical top 24 and an inverted frusto-conical bottom 25, with all the interior surfaces thereof protected by a lining 26 of high temperature firebrick. In addition, the lower portion of the upper chamber is further provided with a layer of insulating material 27 which is interposed between the casing parts 23, 25 and the brick lining 26. An inlet 28 is provided in the apex of the conical top 24 for the admission of heat transfer material and outlets 29 and 30 are provided on each side thereof for the discharge of spent heating gases. The outlet 29 is connected with a stack, not shown, by means of a conduit 31 with the gas flow therethrough controlled by a valve 32. The companion outlet 30 is connected with a valve-controlled duct 33 leading to the suction side of a recirculated gas fan 34 as hereinafter described. A valve-controlled branch pipe 39 is connected to the inlet 28 and leads to a cyclonic type separator 39$^a$, for permitting some of the spent heating gases to scavenge the heat transfer material passing downwardly through the inlet 28 and eliminate fines therefrom.

The interior of the upper chamber 10 is provided with a conical bottom structure 35 which supports the fluent mass of heat transfer material thereon and directs its flow downwardly into the upper end of the throat 14. As disclosed and claimed in the copending application of E. G. Bailey et al., Serial No. 599,180, filed June 13, 1945, now U. S. Patent No. 2,509,854, the conical bottom structure 35 is formed of a multiplicity of generally cubical tuyère blocks 36 placed side-by-side in circular rows between imperforate end rings 37 and 38 of refractory material, the upper ring 37 merging into the interior lining 26 of the chamber while the lower ring 38 is joined to and supported by a cylindrical refractory wall structure 40 surrounding the upper end of the throat 14. A vertical, cylindrical wall 41 is arranged intermediate the wall 40 and the lower portion of the lining 26 of casing 23 and is extended upwardly from the horizontal surface of the bottom lining 26 to a position slightly above the upper end of the wall 40. As shown in Figs. 1 and 2 the wall 40 is provided with a series of vertically elongated horizontal openings 42 therethrough and the wall also supports the inner ends of a circular series of horizontally disposed spaced segmental refractory tiles 43 outwardly extending to the lining 26 of the casing 23. As shown particularly in Fig. 3 these tiles provide a circular series of inwardly tapering openings 44 therethrough. A mass of spherically shaped refractory pieces 45 of larger diameter than the width of the inner ends of the openings 42 and 44 fills the space between the top of tiles 43 and the under side of the conical structure 35, as well as the annular space between the walls 40 and 41. With this construction, the heating gases delivered to the lower portion of the upper chamber 10, through the duct 17, will flow through the openings 42 and 44, through the interstices between the pieces 45 and the openings in the tuyère blocks 36 into the mass of heat transfer material 11 normally contained therein.

The heat transfer material heated in the chamber 10 passes into the throat 14 which extends from the lower end of the structure 35 to a level below the upper end of the subjacent chamber 12. The throat passage is defined by one or more circular or semi-circular pieces of tile 46 made of a wear-resistant refractory material, such as silicon carbide or the like. Preferably, the dimensions of the throat 14 are such as to provide a length sufficient, when filled with the heat transfer material, to restrict gas flow therethrough by reason of the fluid pressure drop, and yet provide a diameter sufficient to permit free flow of the heat transfer material from chamber 10 to chamber 12. Pressure tap connections 47 and 48 are provided at verticaly spaced points in the throat 14, as disclosed in said previously mentioned joint application, and the differential pressure changes therebetween are advantageously used to regulate the outlet dampers from the chamber 10, and thereby the fluid pressure in chamber 10, to maintain a predetermined fluid pressure differential, plus, minus or zero, between the chambers 10 and 12, through a differential pressure controller, as disclosed in our said prior application Ser. No. 502,580, now U. S. Patent No. 2,447,306.

As shown in Figs. 1, 2 and 4, the chamber 12 is circular in horizontal cross-section and is enclosed by a cylindrical metallic casing 50 of substantially uniform diameter which also encloses the chamber 13. At its upper end the casing 50 is enclosed by a domed casing top 51 through which the throat 14 and its surrounding refractories extend. The metallic casings of the upper chamber 10 and the subjacent chamber 12 are spaced apart except for short cylindrical center sections thereof surrounding the throat 14 which are connected by an expansion joint 52. The upper portion of the casing 50 and top 51, defining respectively the side and top of the chamber 12, are protected by a layer of insulating material 54 and an inner wall 55 of high temperature firebrick. The upper end of the chamber 12 is provided with a domed refractory structure 61 which is spaced beneath the lining of the top 51 to provide an annular chamber 63 therebetween. As shown particularly in Figs. 2 and 4, the structure 61 is provided with a circular series of outwardly flaring ports 62 which provide a series of paths for the flow of fluid therethrough from the chamber 12 into the chamber 63. A series of high velocity liquid spray nozzles 59 are provided in chamber 63 and adapted to produce a fog to rapidly cool the product vapors before they pass on out through one or more refractory lined ducts 64 to the point or points of use (not shown). In those cases in which the chamber 63 is used as a quench chamber, the domed structure 61 also serves as a radiation shield between the high temperature heat transfer pellets entering the chamber 12 and the relatively cool chamber 63.

The interior lining of the chamber 12 tapers inwardly from the upper end thereof to form an inverted truncated cone which is coaxial with the throat 14 and merges into a vertical section of the wall 55. At the lower end of the chamber the wall again tapers inwardly to join the open base of an inverted frusto-conical metallic member 57. The member 57 is perforated to permit a flow of fluids therethrough but preventing the outward passage of pellets and at its lower end opens into the throat 15, thereby providing a passageway for the movement of heat transfer material from chamber 12 into the throat 15. A horizontally disposed circular metallic plate 56 is circumferentially attached to the casing 50 and provided with a central opening encircling the base of the member 57. A second metallic plate 58 parallel to and spaced below the plate 56 is also circumferentially attached to the casing 50 and encircles the lower end of member 57 at its connection to the throat 15. Thus, a chamber 60 is formed within the casing 50 between the plates 56 and 58 so as to enclose the perforated member 57. This chamber receives a fluid to be heated through a valved pipe connection 65 and directs the flow of fluid therefrom through the openings in member 57 into the chamber 12.

A temperature resistant metallic distributing head 69 for a fluid to be heated is positioned in the upper portion of the chamber 12, being shown substantially at the elevation of the juncture of the upper inverted truncated cone and the cylindrical portion of the wall 55. The distributing head includes a lower tubular ring 66 having an inside diameter generally equal to the internal diameter of the cylindrical portion of the wall 55 and a second tubular ring 67 having a smaller diameter than and coaxially located at a spaced position above the ring 66. The rings 66 and 67 are connected and held in relative position by a plurality of radially extending inclined tubular arms 68 which also form passageways for the flow of fluid therethrough. The rings 66 and 67 receive fluid through and are supported by a plurality of vertical supply tubes 70 which are connected at their lower end with a horizontal feed pipe 71 extending through one side of the chamber 60. The supply tubes 70 are vertically adjustable to facilitate the vertical adjustment of the distributor head. This adjustment can be made in the apparatus illustrated by varying the length of the flanged nipples 72 forming the lower end of the pipes 70. Each ring of the head 69 is provided with a series of holes therein arranged to direct jets of fluid downwardly and inwardly therefrom into the descending mass of heat transfer material 11 and the ascending flow of fluid introduced to the chamber 12 through the pipe 65. The chamber wall 55 is recessed substantially as shown in Figs. 1 and 2 to accommodate the ring 66 and to permit its vertical adjustment. The effective portion of the chamber 12 through which the fluid discharged from the rings 66 and 67 passes can thus be readily controlled, and thereby the reaction time and temperature of the entering fluid.

It will be observed that the discharge end of the throat tube 46 projects below the lower surface of the domed structure 61 whereby the upper level of heat transfer material within the chamber 12, as at $11^a$, will be spaced beneath the structure 61 and provide a free space therebetween for the flow of fluid leaving the chamber 12. Advantageously, this unrestricted space above the mass of heat transfer material and the series of spaced openings 62 will permit a substantially uniform upward flow of fluid through the chamber 12 so that the time exposure of the flowing fluid to the heat effects of the heat transfer material will be essentially equal in all parts thereof. Such an equalized heat exposure is desirable in preventing localized under and/or overheating of the fluid.

The described construction of the chamber 12 is particularly advantageous for the thermal conversion of hydrocarbon fluids in the liquid or vapor phase, although it is equally advantageous in the decomposition of other fluids requiring high heat transfer rates at elevated temperatures. In the thermal conversion of some hydrocarbons steam is advantageously added to the hydrocarbon feed vapor within the chamber 12 to reduce the average molecular weight of the vapor so as to permit a higher fluid flow velocity through the apparatus without the danger of lifting the heat transfer material. The steam enters the annular chamber 60 through the pipe 65, passes through the perforated cone 57 into the lower portion of the chamber 12 and flows upwardly in direct contact with the descending mass of heat transfer material. In flowing upwardly through the interstices of the heat transfer material, the steam will be well diffused and highly superheated before mingling with jets of hydrocarbon fluid discharging from the distributor head 69. The steam and hydrocarbon fluid are mixed and the gaseous mixture heated to an elevated temperature in passing upwardly through the remaining portion of the mass of heat transfer material in the chamber 12 which forms in effect the reaction or conversion zone of the apparatus. The conversion products flow through the port 62 into the annular chamber 63 where they are rapidly cooled by coming into contact with a water or other liquid fog produced by the spray nozzles 59 before passing therefrom. In the construction described the inlets for the steam and hydrocarbon fluid and the outlet for the gaseous mixture are arranged to provide a substantially uniform temperature of the fluid mixture passing through the duct 64 throughout any cross-section normal to the direction of fluid flow. Such an equal temperature distribution will avoid the possibility of incomplete reaction of part of the vapor and/or over-cracking of other portions of the hydrocarbon stream with the possible formation of coke in chamber 12.

Within the lower confines of the casing 50 the interior of chamber 13 is circular in horizontal cross-section and of substantially uniform diameter from its upper end to a downwardly tapered conical bottom. As shown in Figs. 1 and 2, the lower portion of casing 50 enclosing chamber 13 is lined with a protective layer of high temperature firebrick which at its lower end abuts the base flange of an inverted frusto-conical metallic bottom plate 73. The conical plate 73 is provided with an outlet 74 for heat transfer material at its lower end, and the lower portion of the plate 73, which may represent approximately one-third to one-half of the total area thereof, is perforated to permit the flow of a fluid to be heated upwardly therethrough. A corresponding portion of the casing 50 is also downwardly tapered to a discharge opening 75 spaced below the corresponding outlet 74 of the plate 73. This spacing provides an annular opening beneath the lower end of member 73 whereby any fragments of heat transfer material or other solids passed through the perforations of plate 73, as represented at $11^c$, will rejoin the fluent solid material leaving the chamber 13. The spaced cones at the lower end of the chamber define an annular fluid inlet chamber 76 to which a fluid supply pipe 77 having a control damper $77^a$ is connected for the admission of the fluid to be heated as delivered thereto by a fan 78.

The upper end of the chamber 13 is defined by the plate 58, the underside of which is protected by a lining 79 of firebrick. A metallic throat tube 80 defines the throat passage 15 and projects downwardly through a central opening in the plate 58 to a position below the lining 79 so as to provide a space between the upper surface $11^b$ of the heat transfer material and the lining 79 for the accommodation of a heated fluid outlet 81. In the embodiment of the invention shown in Fig. 1 the fan 78 delivers combustion air to the chamber 13, and, after being heated therein, the air passes through the outlet 81 into a duct 82 controlled by a damper 83 for delivery to the furnace 16. In its passage through chamber 13 the air will tend to burn off any coke or carbon residue deposited on the refractory particles as a result of the cracking operation. Pressure tap connections 110 and 111 are provided at vertically spaced points in the throat 80, similar to those provided in throat 14, and the differential pressure changes therebetween are advantageously used to regulate the cold air inlet damper $77^a$ and/or hot air outlet damper 83, and thereby the air pressure in chamber 13, to maintain a predetermined fluid pressure differential, plus, minus or zero, between the chambers 12 and 13, through a differential pressure controller of the type disclosed in our said prior application, Serial No. 502,580.

The furnace 16 shown in Figs. 1 and 5 has a vertically elongated combustion space, circular in horizontal cross-section, and a side outlet 84 near the top thereof communicating with the lower portion of the chamber 10 through the horizontally extended refractory lined passageway 17. The longitudinal axis of the passageway 17 is normal to and intersects the vertical axis of both the furnace 16 and the chamber 10. The furnace is enclosed by a metal casing 85 and a refractory lining 86 which is separated from the casing 85 by a layer of insulating material 87. The lower end of the lining 86 is extended to form a horizontal refractory ring 88 defining a burner port 90, in which a suitable fluid fuel burner 91 is coaxially mounted. The metal casing 85 of the furnace extends below the ring 88 to join a horizontally disposed end plate 92 having a central opening therethrough which is closed by a detachable cover plate 93 centering and supporting a suitable fluid fuel burner 91, the discharge end of which is positioned in the port 90. The space between the ring 88 and the plates 92 and 93 is divided into upper and lower annular chambers 94 and 95, both of which are lined with refractory materials. As shown, the lower chamber 95 is arranged to receive heated air from the duct 82 and to discharge it upwardly around the burner 91 and through the port 90, where it serves as combustion air for the fuel delivered by the burner 91, the burning fuel generating the heating gases required in the fluid heating apparatus.

The upper chamber 94 receives recirculated, low temperature heating gases delivered thereto from the duct 33 by the fan 34 through a connecting duct 96, with the flow regulated by a valve 99 in the duct 33. In the embodiment shown, the inner circumference of the chamber 94 is sealed so as to direct the flow of recirculated gases upwardly through passages in the chamber walls provided therefor into the combustion space of the furnace. One circular series of vertical passages 97 extends through the ring 88 along the circumference of the furnace chamber, while another circular series of vertical passages 98 extends upwardly through the lining 86 of the furnace to a spaced location above the ring 88. At their upper end the passages 98 are provided with individual horizontal openings 100 radially directing the flow of recirculated gases inwardly through the lining 86 and into the ascending stream of gases within the furnace.

As the burning gases ascend in the furnace 16, the direct effects of the heat so generated are largely shielded from the lining 86 by a protective sheath of low temperature recirculated gases flowing upwardly from the passages 97. The recirculated gases ascending in the furnace gradually mix with the flame and at the level of introduction of the remaining portion of the recirculating gases entering through the ports 100, the newly formed products of combustion and the recirculated gases are thoroughly mixed to form a heating gas stream having a substantially uniform temperature distribution in passing through the duct 17. The length of the furnace 16 is designed to permit complete combustion of the fuel introduced thereto and with regulation of the ratio of fuel to air delivered, a close control of the gaseous constituents in the heating gas stream utilized in the chamber 10 is obtained. Thus, suitable combustion conditions may be established within the furnace as desired, and at the option of the operator, the heating gases generated in and delivered from the furnace, may contain either an excess or deficiency of oxygen, or may approach theoretical combustion conditions wherein neither an excess or deficiency of oxygen will be present in the heating gases. Under any of these conditions the temperature of the heating gases may be altered by changes in the quantity of low temperature heating gases recirculated through the furnace without changing the composition of the heating gases since the composition of the recirculated gases is essentially the same as the newly produced gases. In certain installations where the close control of the gaseous constituents of the heating gases is not required to be of the order indicated the furnace 16 may be omitted and the gases burned in an annular chamber directly surrounding and connected to the lower portion of the upper chamber.

In the operation of the apparatus described for the thermal conversion of a hydrocarbon, such as, for example, for the production of butadiene from naphtha in accordance with the preferred process of this invention, the chambers 10, 12 and 13 as well as throats 14 and 15, are filled with a solid heat transfer material such as refractory pellets of the character described to form a continuous fluent mass with approximately the levels indicated in Fig. 1. The feeder and elevator are controlled so that the pellets move continuously downward through the chambers at a relatively slow rate. The described shape of the chambers and throats causes all portions of the pellet mass or column to move downwardly continuously as long as the feeder is in operation. Fuel is fired in the combustion chamber 16 and the heating gases generated flow through the connecting passageway 17, openings 42 and 44, the interstices between refractory pieces 45 and tuyère blocks 36 into the lower part of the upper chamber 10 at, for example a pressure of about 2.8 p. s. i. and a temperature of approximately 3000° F., passing upwardly through the interstices in the pellet mass in intimate counterflow contact with the descending pellets, whereby the pellets are effectively heated to a temperature slightly higher than 2000° F., and the gases leave through the outlets 29 and 30 and inlet 28 at a relatively low temperature of about 800° F. and at a pressure of about 1.5 p. s. i. The gases from the outlet 29 may discharge either to a stack where the gases are dissipated, or to some heat exchange device where additional heat can be recovered. The highly-heated pellets move downwardly in the column through the throat 14 into the chamber 12. Steam is admitted to the lower portion of the chamber 12 at a pressure of about 4.1 p. s. i. and at a temperature of about 250° F. through the annular chamber 60 and the openings in member 57, passing up through the interstices in the mass of downwardly moving heated pellets in the chamber 12, being superheated to a desired temperature of about 1200° F., by the time it reaches the reaction zone in the chamber 12. The feed stock being treated, in this case naphtha vapor, is admitted through feed pipe 71 at a temperature of about 600° F. and a pressure of about 3.8 p. s. i. and passes through the tubes 70 to distributor head 69 which directs jets of naphtha vapor downwardly into the descending mass of pellets and the ascending stream of superheated steam. The mixture of steam and hydrocarbon vapors then passes upwardly through the descending pellets in the reaction zone, and is discharged through the space openings 62 in the domed structure 61 into an annular chamber 63 at a temperature of about 1600° F. and a pressure of about 3 p. s. i. Although the vapors may be quenched after they have left the apparatus, in the preferred process they are quenched in chamber 63 by coming into contact with a fog produced by four high velocity water sprays which rapidly reduce the temperature of the product gases to about 900° F. At this temperature the gases discharge through outlet 64 to a wash house for complete cooling with minimum loss of butadiene due to polymerization.

On leaving the chamber 12 the pellets pass through the throat 15 into the chamber 13 at a temperature of about 1100° F. Air at a temperature of about 80° F. and pressure of 4.5 p. s. i. from the fan 78 is admitted to the bottom of this chamber passing in counter-current relation to the hot pebbles moving downwardly therethrough. The resulting hot air passes through the outlet 81 into the valved duct 82 for delivery to the furnace 16 at a temperature of about 1000° F. for use as combustion air for the fluid fuel, preferably oil or gas, being burned therein.

In certain installations where the desired heating gas temperature and temperatures in the chambers 10 and 12 are not required to be of the order indicated herein, the chamber 13 may be omitted and the pellets discharged from the chamber 12 to the pipe 18. In such cases, the combustion air is supplied at room temperature to the furnace 16.

The temperature of the pellets, and also the temperatures of the feed stock vapor and steam entering the chamber, are closely regulated, as is also the contact time of the gaseous mixture with the heated pellets in the reaction zone in order to accomplish the desired reaction. Since it has been found that the yield of butadiene increases as temperature is increased and contact time reduced until a temperature of approximately 1730° F. is attained, at which point it breaks downwardly rather sharply, it is desirable to maintain the gaseous mixture temperature in the reaction zone as high as 1600° F. and a contact time as low as five hundredths of a second.

Although it has been found to be both possible and practical to heat and crack the hydrocarbons in the reaction zone of the pebble heater in the absence of steam, it has been found desirable to mix the hydrocarbon feed with superheated steam since it reduces the average molecular weight and thus permits operation at shorter contact times due to the higher permissible lifting velocity with gases of low density. In the above given example of producing butadiene, the naphtha proportions of approximately 80% naphtha to 20% steam have been found entirely suitable. Furthermore, steam introduced below the reaction zone tends to improve flow distribution within the reaction bed itself. Counterflow heating of the steam prior to the reaction zone also results in an efficient utilization of heat in the pebbles, and consequently more efficient operation of the pebble heater as a unit. Finally by locating the steam superheating section below the reaction zone, it becomes possible to vary the length of the reaction zone by changing the location of the feed vapor distributing ring, thus affording flexibility in operating conditions.

The distributing head 69 provided in the furnace insures good flow distribution in the relatively short reaction zone. This tends to avoid any stratification which would cause under-reaction of part of the hydrocarbon feed and overcracking of the remainder. The uniformly distributed slots 62 in the brick arch forming the roof of the chamber 12 also help to achieve this result.

In one test run made in apparatus of the general character described in which naphtha hydrocarbons were thermally treated to produce a cracked gas mixture, a mixture of approximately 40% by weight of naphtha and 60% by weight of steam was fed into the reaction chamber at a temperature of approximately 220° F. and a pressure of 12.7 p. s. i. The heat transfer material entered the upper chamber at 408° F. and was heated during its descent to a temperature of approximately 1850° F. The heating gases were supplied to the upper chamber at a temperature of 2250° F. and left the upper chamber at aproximately 610° F. The naphtha steam mixture was heated to 1700° F. in the lower reaction chamber during its passage therethrough. The cracked gas mixture was thereupon rapidly quenched to a temperature of approximately 570° F. Upon analysis the cracked gas mixture was found to have the following content:

|  | Percent |
| --- | --- |
| Hydrogen | 4.67 |
| Methane | 49.50 |
| Ethylene | 30.70 |
| Ethane | 2.38 |
| Total C3 unsaturated | 6.94 |

Propane _____ 1.11
Total C4 unsaturated _____ 5.95

When the improved process for the thermal decomposition of fluid hydrocarbons is used for the production of acetylene from gasoline the optimum temperatures in the heating and reaction zones of the fluid heater are considerably higher and the contact time slightly more than used in the preferred method described for the production of butadiene from naphtha. In most other respects the representative operating conditions are much the same. For example, it has been found that high yields of acetylene can be obtained from gasoline when operating in accordance with our process if the heat transfer material used is heated to about 2700° F., the temperature in the hydrocarbon reaction zone is kept in the neighborhood of 2380° F. and the depth of the reaction zone is regulated so that the contact time is less than .1 of one second. For optimum results the resulting cracked gas mixture should be quenched to a temperature of about 750° F. in about .03 seconds after leaving the reaction zone.

Suitable control mechanism for the fluid heater illustrated is disclosed and claimed in a copending application of Paul S. Dickey, Serial No. 35,175, filed June 25, 1948, now U. S. Patent No. 2,601,102.

While the above description and the drawings submitted herewith disclose preferred and practical embodiments of the fluid heater and the method of thermally converting hydrocarbon therein in accordance with this invention it will be understood by those skilled in the art that the specific details of construction and arrangement of parts shown and described, are by way of illustration and not to be construed as limiting the scope of the invention.

What is claimed is:

1. The continuous method of thermally converting hydrocarbon gases or vapors by contact with recycled inert solid heat transfer material which comprises continuously introducing a heat transfer material into the upper portion of a heating chamber and heating said material therein to a temperature considerably in excess of the decomposition temperature of the hydrocarbon to be converted by continuously passing a fluent mass of said material downwardly through the chamber in countercurrent contact with a mixture of combustion gases and air introduced from a furnace outside of said heating chamber, recirculating gases to said furnace from said heating chamber, causing said heat transfer material to continuously leave said heating chamber and enter the upper part of a subjacent conversion chamber, passing the descending fluent mass of material downwardly therethrough, introducing steam into the lower portion of said conversion chamber and superheating it by continuously passing the steam upwardly through the interstices of the descending fluent mass of heat transfer material, introducing a hydrocarbon vapor into said conversion chamber at a point well above the point of introduction of said steam, causing said hydrocarbon vapor to mix with the superheated steam and heating the mixture to a decomposition temperature of the hydrocarbon by continuously passing the vapor upwardly through the interstices of the descending fluent mass of heat transfer material, passing the mixture upwardly through a radiant heat transfer zone above said heat transfer material and in a plurality of substantially equal flow paths to a radiant heat shielded collecting chamber, maintaining said mixed vapors in a decomposition temperature range for less than one second and continuously returning said transfer material to the upper part of the heating chamber.

2. A process according to claim 1 wherein said hydrocarbon vapor feed stock is cracked at a temperature in excess of 2000° F. for a period less than one second and the product thereof is quenched to a temperature at which acetylene is stable.

3. The continuous method of thermally converting hydrocarbon gases or vapors by contact with recycled inert solid heat transfer material which comprises continuously introducing a heat transfer material into the upper portion of a heating chamber and heating said material therein to a temperature considerably in excess of the decomposition temperature of the hydrocarbon to be converted by continuously passing a fluent mass of said material downwardly through the chamber in countercurrent contact with a mixture of combustion gases and air introduced from a furnace outside of said heating chamber, recirculating gases to said furnace from said heating chamber, causing said heat transfer material to continuously leave said heating chamber and enter the upper part of a subjacent conversion chamber, passing the descending fluent mass of material downwardly therethrough, introducing steam into the lower portion of said conversion chamber and superheating it by continuously passing the steam upwardly through the interstices of the descending fluent mass of heat transfer material, introducing a hydrocarbon vapor into said conversion chamber at a point well above the point of introduction of said steam, causing said hydrocarbon vapor to mix with the superheated steam and heating the mixture to a decomposition temperature of the hydrocarbon by continuously passing the vapor upwardly through the interstices of the descending fluent mass of heat transfer material, passing the mixture upwardly through a radiant heat transfer zone above said heat transfer material and in a plurality of substantially equal flow paths to a radiant heat shielded collecting chamber, maintaining said mixed vapors in a decomposition temperature range of the hydrocarbon for less than one second, causing said heat transfer material to continuously leave the conversion chamber and enter a subjacent cooling chamber, passing the descending fluent mass of material downwardly therethrough, introducing air into the lower portion of said cooling chamber and heating it by continuously passing the air upwardly through the interstices of the descending fluent mass, and continuously withdrawing said heat transfer material from said cooling chamber and returning it to the upper part of the heating chamber.

4. A process according to claim 3 wherein said hydrocarbon vapor is heated to a temperature in excess of 2000° F. for a period less than one second to produce a cracked product containing acetylene.

5. The continuous method of thermally producing butadiene from naphtha vapor by contact with recycled inert solid heat transfer material which comprises continuously introducing a heat transfer material into the top of a heating chamber and heating said material therein to a temperature considerably in excess of the decomposition temperature of the naphtha by continuously passing the heat transfer material in the form of a fluent mass downwardly through the chamber in countercurrent contact with an ascending gaseous heating medium, causing said heat transfer material to continuously leave said heating chamber and enter the upper part of the conversion chamber, passing the descending fluent mass of heat transfer material downwardly therethrough, introducing naphtha vapor into said conversion chamber at a vertically adjustable position and heating said vapor therein to a decomposition temperature by continuously passing the vapor upwardly through the interstices of the descending fluent mass of heat transfer material, passing the vapor upwardly in a plurality of substantially equal flow paths into a radiant heat shielded zone in the upper portion of said conversion chamber, quenching said vapor to a partially stabilized temperature of about 900° F. to maintain said vapor at a decomposition temperature for less than one tenth of one second, and continuously returning said heat transfer material to the upper part of the heating chamber.

6. A process according to claim 3 wherein said hydrocarbon vapor is heated to a temperature in excess of 2000° F. for a period less than one second to produce a cracked product containing acetylene, ethylene and fuel gas, and separating and burning said fuel gas to heat the heat transfer material in said upper chamber.

7. The continuous method of thermally producing butadiene from naphtha vapor by contact with recycled inert solid heat transfer material which comprises continuously introducing a heat transfer material into the top of a heating chamber and heating said material therein to a temperature in excess of 2000° F. by continuously passing the material in the form of a fluent mass downwardly through the chamber in counter-current contact with an ascending gaseous heating medium, causing said heat transfer material to continuously leave said heating chamber and enter the upper part of the conversion chamber, passing the descending fluent mass of heat transfer material downwardly therethrough, introducing the hydrocarbon vapor into said conversion chamber at a vertically adjustable position and heating said vapor therein to a temperature in excess of 1600° F. by continuously passing the vapor upwardly through the interstices of the descending fluent mass of heat transfer material, passing the vapor upwardly in a plurality of substantially equal flow paths into a radiant heat shielded zone in the upper portion of said conversion chamber, quenching said vapor to a partially stabilized temperature of about 900° F. to maintain said vapor at a decomposition temperature for less than one tenth of one second, and continuously returning said heat transfer material to the upper part of the heating chamber.

8. The continuous method of thermally producing butadiene from naphtha vapor by contact with recycled inert solid heat transfer material which comprises continuously introducing a heat transfer material into the upper portion of a heating chamber and heating said material therein to a temperature in excess of 2000° F. by continuously passing a fluent mass of said material downwardly through the chamber in countercurrent contact with a mixture of combustion gases and air introduced from a furnace outside of said heating chamber, causing said heat transfer material to continuously leave said heating chamber and enter the upper part of a subjacent conversion chamber, passing the descending fluent mass of material downwardly therethrough, introducing steam into said conversion chamber and superheating it by continuously passing the steam upwardly through the interstices of the descending fluent mass of heat transfer material, introducing naphtha vapor into said conversion chamber at a vertically adjustable position well above the point of introduction of said steam, causing said vapor to mix with the superheated steam and heating the mixture to a temperature of about 1700° F. by continuously passing the vapor upwardly through the interstices of the descending fluent mass of heat transfer material, passing the vapor upwardly in a plurality of substantially equal flow paths into a radiant heat shielded zone in the upper portion of said conversion chamber, quenching said vapor to a partially stabilized temperature of about 900° F. to maintain said mixed vapors at said decomposition temperature of the hydrocarbon for less than one tenth of one second and continuously returning said heat transfer material to the upper part of the heating chamber.

9. The continuous method of thermally converting hydrocarbon gases or vapors by contact with recycled inert solid heat transfer material which comprises continuously introducing a solid heat transfer material into the upper part of a heating chamber and heating said material therein to a temperature considerably in excess of the decomposition temperatures of the hydrocarbon to be converted by continuously passing the material in the form of a fluent mass downwardly through the chamber in countercurrent contact with an ascending gaseous heating medium, causing said heat transfer material to continuously leave said heating chamber and enter the upper part of a conversion chamber, passing the descending fluent mass of heat transfer material downwardly therethrough, introducing hydrocarbon vapor into said conversion chamber at an intermediate level therein, heating said vapor therein to a decomposition temperature by continuously passing the vapor upwardly through the interstices of the descending fluent mass of heat transfer material, regulating the time said hydrocarbon vapor is maintained at a decomposition temperature by regulating the time said vapor is maintained at a decomposition temperature by adjusting the depth of heat transfer material in contact with said hydrocarbon vapor within said conversion chamber, and continuously returning said heat transfer material to the upper part of the heating chamber.

10. The continuous method of thermally converting hydrocarbon gases or vapors by contact with recycled inert solid heat transfer material which comprises continuously introducing a solid heat transfer material into the upper part of a heating chamber and heating said material therein to a temperature considerably in excess of the decomposition temperatures of the hydrocarbon to be converted by continuously passing the material in the form of a fluent mass downwardly through the chamber in countercurrent contact with an ascending gaseous heating medium, causing said heat transfer material to continuously leave said heating chamber and enter the upper part of a conversion chamber, passing the descending fluent mass of heat transfer material downwardly therethrough, introducing hydrocarbon vapor into said conversion chamber through a distributor head, regulating the position of the distributor head in the conversion chamber to control and regulate the depth of the effective portion of the conversion chamber, introducing a gaseous diluent into said conversion chamber at a position spaced below said distributor head, heating said diluent and vapor therein to a vapor decomposition temperature by continuously passing the mixture upwardly through the interstices of the descending fluent mass of heat transfer material, passing the mixture upwardly through a radiant heat transfer zone above said heat transfer material and in a plurality of substantially equal flow paths to a radiant heat shielded collecting chamber, maintaining said mixture in a hydrocarbon decomposition temperature range for less than one second, and continuously returning said heat transfer material to the upper part of the heating chamber.

References Cited in the file of this patent

UNITED STATES PATENTS

| Number | Name | Date |
|---|---|---|
| 2,317,379 | Hemminger | Apr. 27, 1943 |
| 2,399,450 | Ramseyer | Apr. 30, 1946 |
| 2,405,395 | Bahlke et al. | Aug. 6, 1946 |
| 2,420,145 | McAfee | May 6, 1947 |
| 2,432,503 | Bergstrom et al. | Dec. 16, 1947 |
| 2,432,520 | Ferro, Jr. | Dec. 16, 1947 |
| 2,432,962 | Bergstrom | Dec. 16, 1947 |
| 2,443,337 | Weber | June 15, 1948 |
| 2,447,306 | Bailey et al. | Aug. 17, 1948 |
| 2,448,922 | Simpson et al. | Sept. 7, 1948 |
| 2,500,870 | Robinson | Mar. 14, 1950 |
| 2,507,823 | Simms | May 16, 1950 |
| 2,543,742 | Evans | Feb. 27, 1951 |
| 2,571,749 | Norton | Oct. 16, 1951 |

FOREIGN PATENTS

| Number | Country | Date |
|---|---|---|
| 589,879 | Great Britain | July 2, 1947 |